(12) United States Patent
Stokes (10) Patent No.: US 9,328,754 B2
(45) Date of Patent: May 3, 2016

(54) FASTENER

(71) Applicant: Kenneth D. Stokes, Sylvania, OH (US)

(72) Inventor: Kenneth D. Stokes, Sylvania, OH (US)

(73) Assignee: K & K Products, LLC, Northwood, OH (US)

( * ) Notice: Subject to any disclaimer, the term of this patent is extended or adjusted under 35 U.S.C. 154(b) by 309 days.

(21) Appl. No.: 14/010,582

(22) Filed: Aug. 27, 2013

(65) Prior Publication Data

US 2014/0182095 A1 Jul. 3, 2014

Related U.S. Application Data

(63) Continuation-in-part of application No. 13/832,434, filed on Mar. 15, 2013, now abandoned.

(60) Provisional application No. 61/748,294, filed on Jan. 2, 2013.

(51) Int. Cl.
*E01B 9/12* (2006.01)
*F16B 5/06* (2006.01)
*F16B 1/00* (2006.01)

(52) U.S. Cl.
CPC ....... *F16B 5/0692* (2013.01); *F16B 2001/0035* (2013.01); *Y10T 24/4604* (2015.01)

(58) Field of Classification Search
CPC ........... F16B 5/0692; F16B 2001/0035; Y10T 24/4604; E01B 9/12
USPC ............. 411/337, 338; 16/4–5; 24/303, 706.2
See application file for complete search history.

(56) References Cited

U.S. PATENT DOCUMENTS

| 255,640 | A | * | 3/1882 | Loewenthal | 24/114.4 |
|---|---|---|---|---|---|
| 2,742,250 | A | | 4/1956 | Cronberger | |
| 3,009,381 | A | * | 11/1961 | Rapata | 411/337 |
| 3,251,260 | A | | 5/1966 | Serdechny | |
| 4,138,921 | A | | 2/1979 | McGauran et al. | |
| 4,878,792 | A | * | 11/1989 | Frano | 411/339 |
| 5,603,472 | A | | 2/1997 | Hutter, III | |
| 5,651,632 | A | * | 7/1997 | Gordon | 403/319 |
| 5,911,266 | A | | 6/1999 | Jacobs | |
| 6,221,120 | B1 | | 4/2001 | Bennington et al. | |
| 6,477,749 | B1 | * | 11/2002 | Reiter | 24/303 |
| 6,497,003 | B2 | * | 12/2002 | Calabrese | 16/4 |
| 7,789,928 | B2 | | 9/2010 | Stepp | |
| 8,434,982 | B2 | * | 5/2013 | Henriksen, Jr. | 411/338 |
| 2006/0182513 | A1 | * | 8/2006 | Dortch | 411/338 |
| 2009/0113674 | A1 | * | 5/2009 | Waddell et al. | 24/114.12 |
| 2010/0037812 | A1 | * | 2/2010 | Sahr et al. | 114/363 |
| 2010/0242230 | A1 | * | 9/2010 | Cohen | 24/41.1 |

* cited by examiner

*Primary Examiner* — Roberta Delisle
(74) *Attorney, Agent, or Firm* — Fraser Clemens Martin & Miller LLC; Michael E. Dockins

(57) ABSTRACT

A fastener for removably attaching a filter material to a mounting structure includes a base and corresponding safety retainer. The base includes an elongate shaft having a first end and a second end, the first end including an attachment means for removably attaching the fastener to the mounting structure. The safety retainer is configured to be removably received onto the shaft to secure at least a portion of the filter material between the safety retainer and the base.

19 Claims, 6 Drawing Sheets

FASTENER

CROSS-REFERENCE TO RELATED APPLICATION

This application is a continuation-in-part of, and claims the benefit of, U.S. patent application Ser. No. 13/832,434 which claims the benefit of U.S. Provisional Patent Application Ser. No. 61/748,294 filed Jan. 2, 2013, the entire disclosures of which is hereby incorporated herein by reference.

FIELD OF THE INVENTION

The present invention relates generally to a fastener and, more particularly, to a fastener configured to removably attach a material to a mounting structure.

BACKGROUND OF THE INVENTION

Many different types of fasteners are used in structures and assemblies to secure one panel or covering to another component of a structure or assembly. One form of such fasteners includes a threaded body having head formed thereon. The threaded body engages a threaded bore or a blind bore of the structure or assembly. Other forms of such fasteners include magnetic fasteners. Magnetic fasteners are generally considered to be advantageous to conventional fasteners because of the convenience they offer. For example, components with a pair of counterpart magnetic fasteners mounted thereon can be easily joined and separated. More particularly, the components can be easily joined because, once the corresponding counterparts are in mutual proximity, mutual magnetic attraction will bring the magnetic fasteners together.

It would be desirable to produce a fastener which is configured to removably attach a material to a mounting structure, wherein a structural complexity and cost thereof are minimized.

SUMMARY OF THE INVENTION

In concordance and agreement with the present disclosure, a fastener which is configured to removably attach a material to a mounting structure, wherein a structural complexity and cost thereof are minimized, has surprisingly been discovered.

In one embodiment, a fastener assembly, comprises: a base including an elongate shaft having a first end and a second end, the first end including an attachment means for removably attaching the fastener assembly to a mounting structure; and a retainer configured to be removably received onto the shaft to secure at least a portion of a material between the retainer and the base.

In another embodiment the invention relates to a method of producing a fastener assembly.

The method comprises the step of: forming a base from a first material, the base including an elongate shaft configured to removably receive a retainer thereon for securing at least a portion of a material between the retainer and the base, wherein a first end of the shaft includes an attachment means for removably attaching the fastener to a mounting structure.

In yet another embodiment, the invention relates to a method of removably attaching a filter material to a mounting structure.

The method comprises the steps of: providing a fastener assembly including a base and a retainer; securing at least a portion of the filter material between the base and the retainer of the fastener assembly; and disposing the fastener assembly and the filter material onto the mounting structure.

In another embodiment, a fastener assembly comprises a base including an elongate shaft having a first end and a second end, the first end including an attachment means for removably attaching the fastener assembly to a mounting structure; and a safety retainer having a hollow sleeve configured to be removably received onto the shaft to secure at least a portion of a material between the safety retainer and the base.

In yet another embodiment, a fastener assembly comprises a base including an elongate shaft having a first end and a second end, the first end including an attachment means for removably attaching the fastener assembly to a mounting structure; and a safety retainer having a hollow sleeve to receive the elongate shaft and a body to secure the at least a portion of the material between the safety retainer and the base.

In yet another embodiment, a fastener assembly comprises a base including an elongate shaft having a first end and a second end, the first end including an attachment means for removably attaching the fastener assembly to a mounting structure; and a safety retainer having a hollow sleeve to receive the elongate shaft of the base and a body to secure the at least a portion of the material between the safety retainer and the base, wherein one of the elongate shaft and the hollow sleeve has a pointed end.

BRIEF DESCRIPTION OF THE DRAWINGS

The above, as well as other objects and advantages of the invention, will become readily apparent to those skilled in the art from reading the following detailed description of the invention when considered in the light of the accompanying drawings in which.

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the scope of the invention in any manner.

Figure 8:
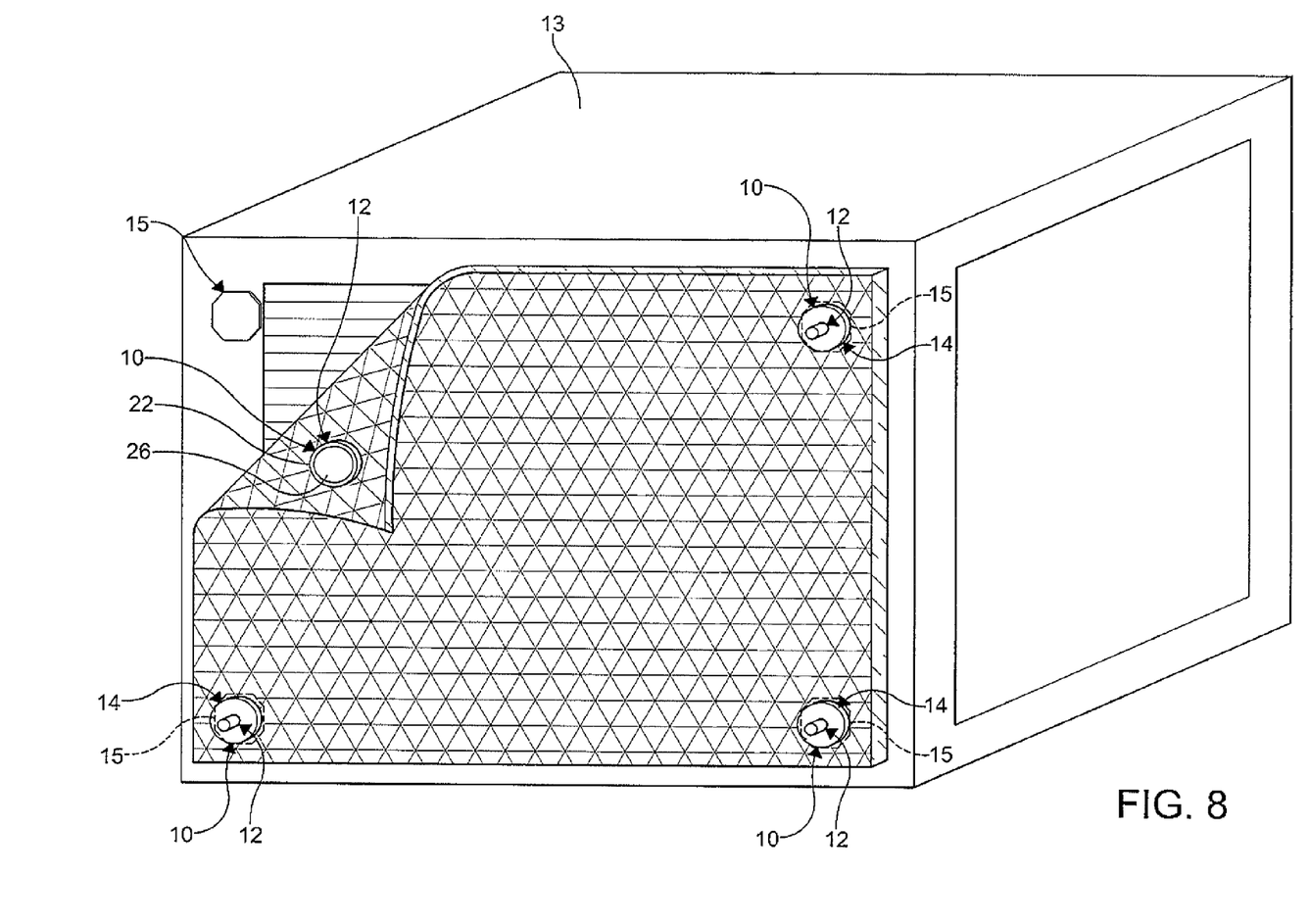
FIG. 8 is a perspective view of an air conditioning unit having the material attached thereto by a plurality of the fastener assemblies illustrated in one of FIGS. 1-4, 5, and 6 including the magnetic interfaces illustrated in FIG. 7.

FIGS. 1-4 depict a fastener assembly 10 according to the present invention. The fastener assembly 10 shown is used to removably attach a material 11 (e.g. a washable filter material shown in FIGS. 3-6 and 8) to a mounting structure 13 such as an inlet grate of a heating, ventilating, and air conditioning unit shown in FIG. 8, for example. The fastener assembly 10 includes a base 12 and a retainer 14. Each of the base 12 and the retainer 14 can be formed from any suitable material such as a plastic material, a non-magnetic metal material, a magnetic metal material, or a combination thereof, for example.

Figure 7:
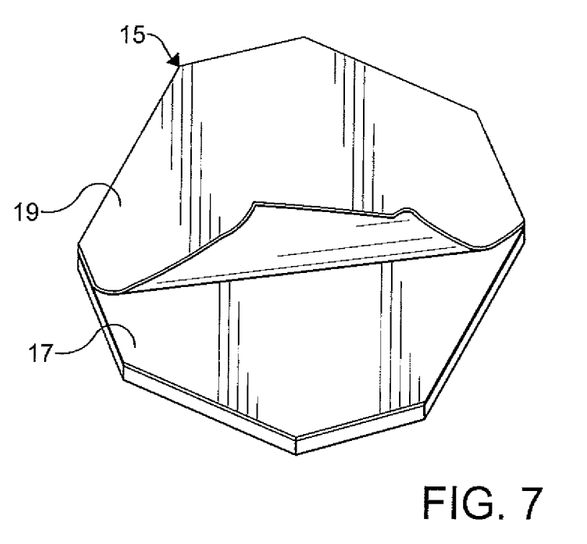
FIG. 7 is an enlarged perspective view of a magnetic interface of the fastener assembly illustrated in FIGS. 1-6 having an attachment means disposed thereon and configured to removably attach the material to a non-magnetic mounting structure.

In certain embodiments, the fastener assembly 10 further includes a magnetic interface 15 (shown in FIG. 7) configured to be removably or permanently affixed to a mounting structure 13 that is not magnetic in order to removably attach the material 11 to the mounting structure 13. As illustrated in FIG. 7, the magnetic interface 15 can be a plate-like member or a disk formed from a magnetically attractive material such as an iron material, a nickel material, a cobalt material, or a combination thereof, for example. It is understood, however, that the magnetic interface 15 can be any member of a suitable size and shape. Various attachment means can be used to removably or permanently affix the magnetic interface 15 to the non-magnetic mounting structure 13 such as a double-sided tape 17 having at least one removable protective covering 19 disposed on one surface thereof, for example. Those skilled in the art will appreciate that the fastener assembly 10 can be used in other applications and systems than described herein if desired.

With renewed reference to FIGS. 1-4, the base 12 includes an elongate shaft 16 having a first end 18 and a second end 20 opposite the first end 18. The shaft 16 shown has a generally circular cross-sectional shape. It is understood, however, that the shaft 16 can have any shape and size as desired. The first end 18 of the shaft 16 is configured to facilitate removable attachment of the fastener assembly 10 to the mounting structure 13 or the magnetic interface 15 disposed on the mounting structure 13. In certain embodiments, the first end 18 has a radially outwardly extending annular flange 22 formed thereon. A cavity 24 formed in the first end 18 receives an attachment means 26 therein such as a magnet, and more particularly a neodymium magnet, for example. The cavity 24 and the attachment means 26 can have any shape and size as desired such as circular, rectangular, square, triangular, or an irregular shape, for example. It is understood that the first end 18 may include other means of removably attaching the fastener assembly 10 to the mounting structure 13 or the magnetic interface 15 such as adhesive, hook and loop tape, and the like, for example.

Figure 1:
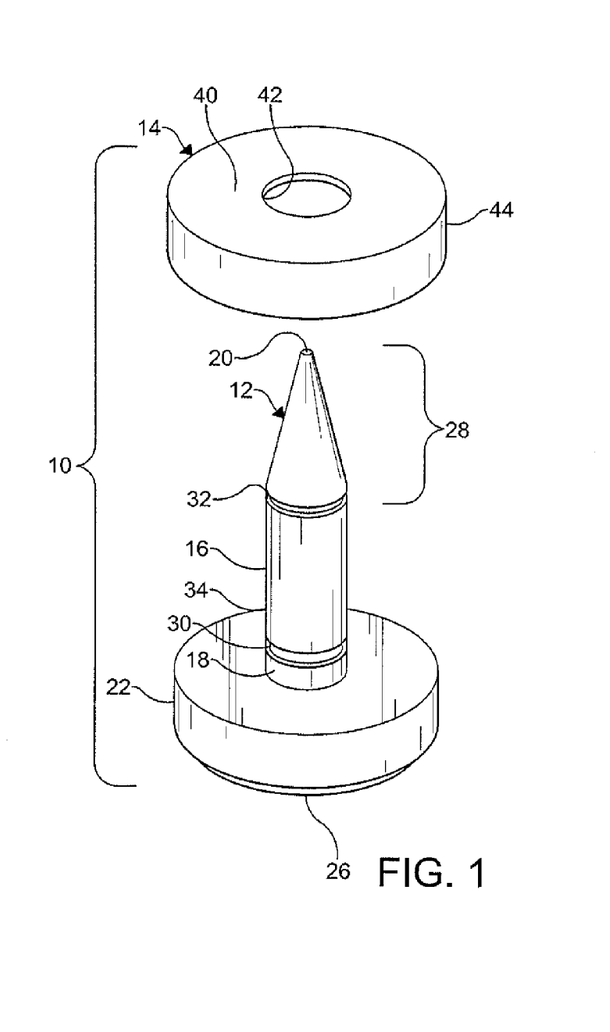
FIG. 1 is an exploded top perspective view of a fastener assembly according to the present invention, wherein the fastener assembly includes a retainer and a base having a first recess and a second recess.
Figure 2:
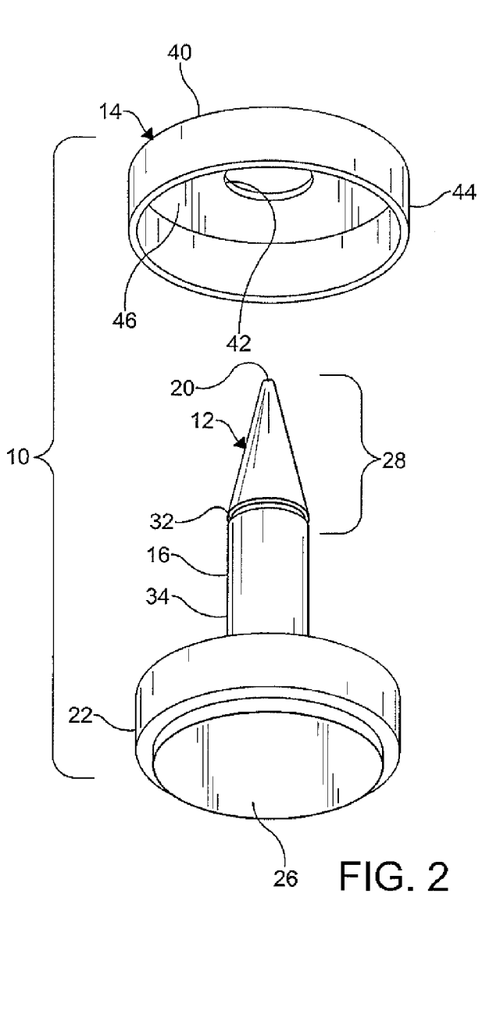
FIG. 2 is an exploded bottom perspective view of the fastener assembly illustrated in FIG. 1.
Figure 3:
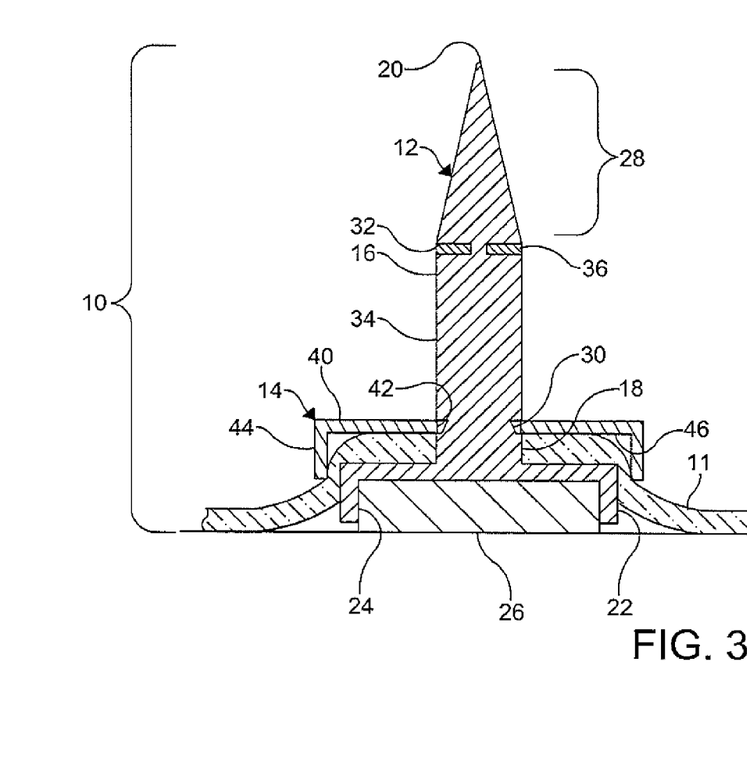
FIG. 3 is a cross-sectional view of the fastener assembly illustrated in FIGS. 1-2, showing the second recess having a filler material disposed therein and a portion of a material to be removably attached to a mounting structure compressed between the retainer and the base.
Figure 4:
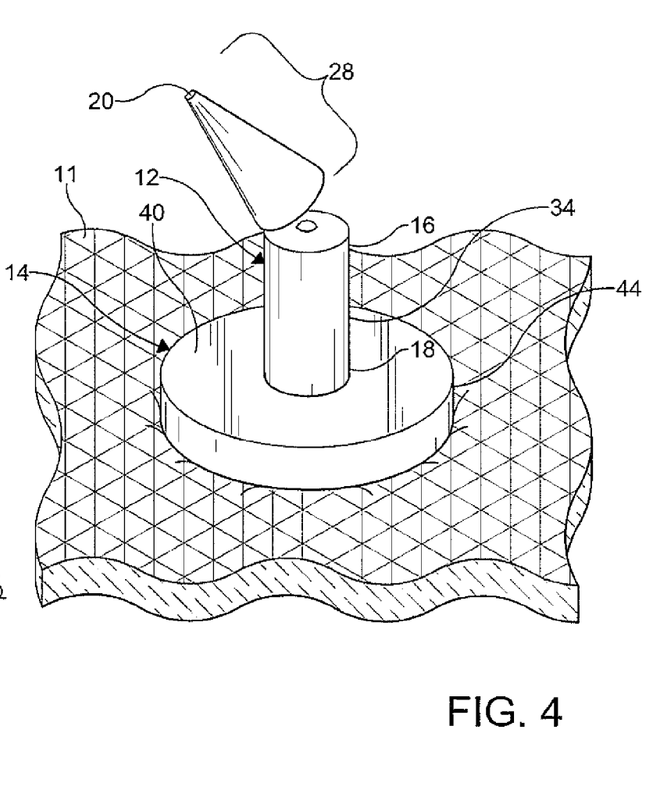
FIG. 4 is a top perspective view of the fastener assembly illustrated in FIG. 3, showing a pointed end portion of the base being removed.

In certain embodiments, the second end 20 is tapered forming a substantially conical or pointed end portion 28 of the shaft 16. The pointed end portion 28 allows the shaft 16 to be easily inserted through the material 11 without a predefined opening formed therein. The second end 20 includes spaced apart first and second annular recesses 30, 32 formed in an outer surface 34 thereof. Additional or fewer recesses than shown can be employed if desired. The recesses 30, 32 shown extend continuously about a circumference of the shaft 16. The first recess 30 is formed adjacent the first end 18 of the base 12 and configured to secure the retainer 14 to the base 12. The second recess 32 is formed adjacent the pointed end portion 28 of the second end 20 of the shaft 16 and is configured to facilitate a separation of the pointed end portion 28 from the base 12, as shown in FIG. 4. In certain embodiments, the second recess 32 initially includes a filler material 36 disposed therein to militate against an ensnaring of the material 11 during an insertion of the shaft 16 of the base 12 of the fastener assembly 10 through the material 11. It is understood, however, that the first recess 30 or both of the recesses 30, 32 may initially include the filler material 36 to militate against an ensnaring of the material 11 during the insertion of the shaft 16 of the base 12 of the fastener assembly 10 through the material 11 if desired.

Figure 5:
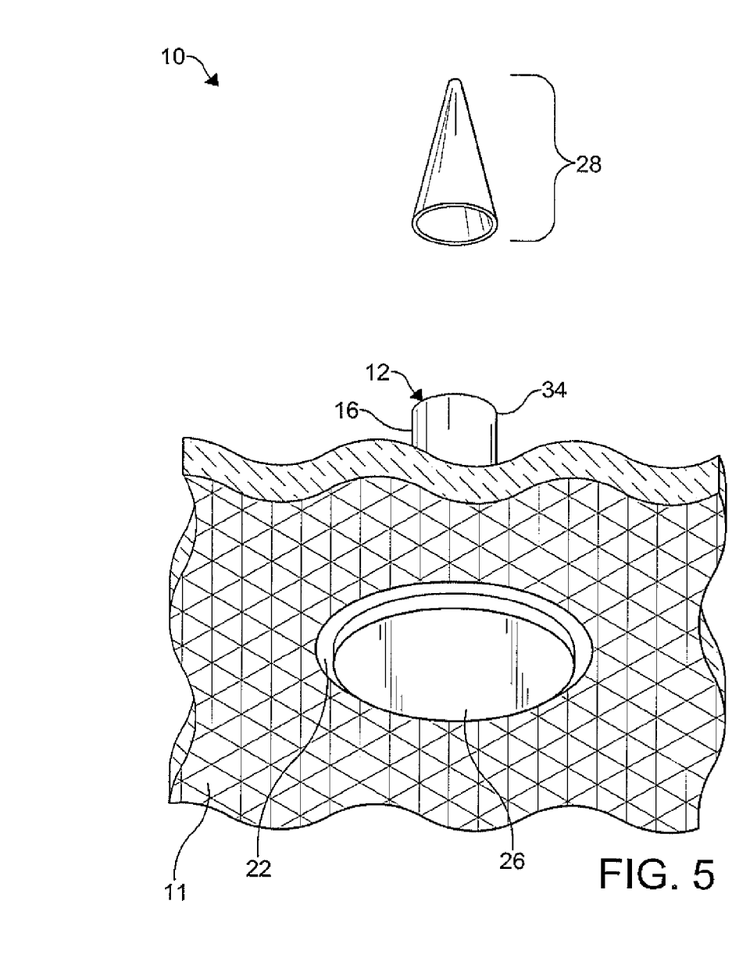
FIG. 5 is a bottom perspective, view of a fastener assembly according to another embodiment of the invention, showing a separate reusable component configured to be removably received onto a base of the fastener assembly to allow a portion of the base to be inserted through a material.
Figure 6:
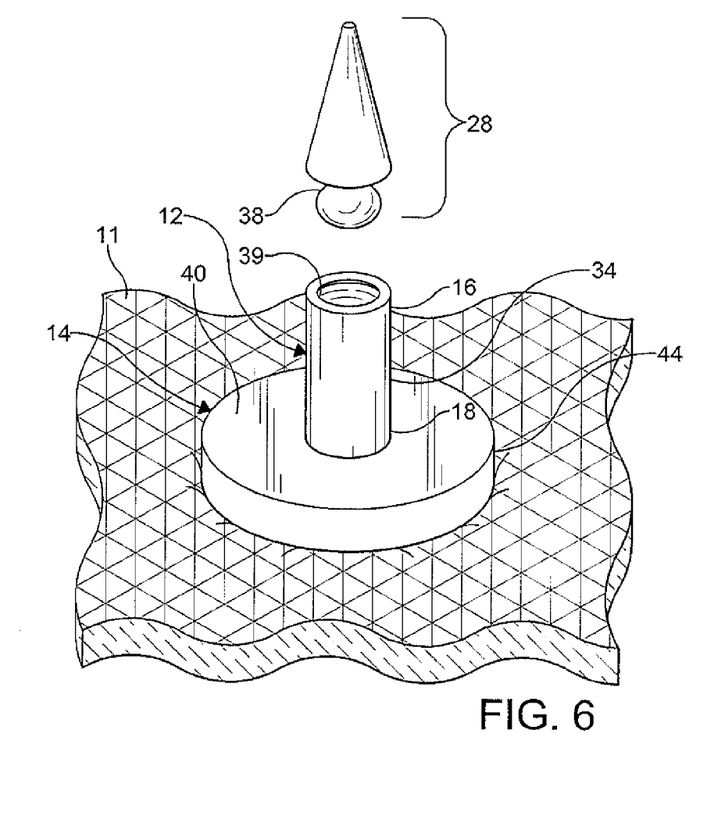
FIG. 6 is a top perspective view of a fastener assembly according to yet another embodiment of the invention, showing a separate reusable component having a generally spherical portion configured to be removably received into a socket formed in a base of the fastener assembly to allow a portion of the base to be inserted through a material.

Alternatively, the pointed end portion 28 of the base 12 may be a separate reusable component. In a non-limiting example illustrated in FIG. 5, the pointed end portion 28 of the base 12 is a separate reusable hollow component which is configured to be removably received onto the shaft 16 of the fastener assembly 10 to allow the shaft 16 to be inserted through the material 11. In another non-limiting example, the pointed end portion 28 of the base 12 is a separate reusable component having a generally spherical portion 38 formed thereon which is configured to be removably received into a socket 39 formed in the shaft 16 of the base 12 as shown in FIG. 6. It is understood, however, that the reusable pointed end portion 28 can be removably coupled to the shaft 16 of the base 12 by any means as desired such as an interference fit, a snap-fit, a threaded connection, a twist connection, and the like, for example. The reusable pointed end portion 28 can be used repeatedly for numerous fastener assemblies 10, thereby minimizing waste and resources required to produce the pointed end portion 28 for each fastener assembly 10.

In certain embodiments, the retainer 14 is a generally circular body 40 having a central aperture 42 formed therein and a skirt portion 44 depending therefrom. An inner diameter of the central aperture 42 is slightly smaller than an outer diameter of the shaft 16 of the fastener assembly 10 to allow a portion of the body 40 of the retainer 14 to be received into the first recess 30, and thereby secure the retainer 14 on the base 12. The skirt portion 44 extends from an outer peripheral edge of the body 40 to form a cavity 46 for receiving the material 11 therein. An outer diameter of the skirt portion 44 is larger than an outer diameter of the flange 22 of the base 12 to allow the material 11 to be received therebetween.

In operation, the shaft 16 of the base 12 of the fastener assembly 10 is inserted into the material 11 having the pointed end portion 28 of the base 12 pierce through the material 11. The shaft 16 of the base 12 is caused to extend through the material 11 until the material 11 abuts the flange 22 of the base 12 and the shaft 16 extends outwardly from the material 11. Thereafter, the retainer 14 is placed onto the shaft 16 of the base 12 having the shaft 16 extend through the central aperture 42. The retainer 14 travels along the shaft 16 until a portion of the body 40 of the retainer 14 is received into the first recess 30 and secured to the base 12. As the retainer 14 is secured on the base 12, the material 11 is received into the cavity 46 formed in the retainer 14 and compressed between the retainer 14 and base 12, thereby securing the fastener assembly 10 to the material 11. When the fastener assembly 10 is secured to the material 11, the flange 22 is caused to be received into the material 11 which causes a surface of the attachment means 26 to be substantially flush or recessed within a surface of the material 11.

Once the fastener assembly 10 is secured to the material 11, the pointed end portion 28 of the base 12 is removed. In certain embodiments, the pointed end portion 28 is broken off from the base 12 at the second recess 32 by a snapping action. It is understood, however, that the pointed end portion 28 can be removed from the base 12 by other means as desired such as using a hand tool (i.e. material snips, scissors, radial cutter, etc.), for example. In other embodiments, the pointed end portion 28 is a separate reusable component and is easily removed from the base 12 without having to fracture the shaft 16. Once the pointed end portion 28 is removed, the attachment means 26 disposed in the base 12 is caused to contact the mounting structure 13 or the magnetic interface 15 disposed on the mounting structure 13. Because the surface of the attachment means 26 is substantially flush or recessed within the surface of the material 11, a space between the material 11 and the mounting structure 13 is minimized, which militates against debris and other undesired material from bypassing the material 11 and reaching the mounting structure 13.

Figure 9:
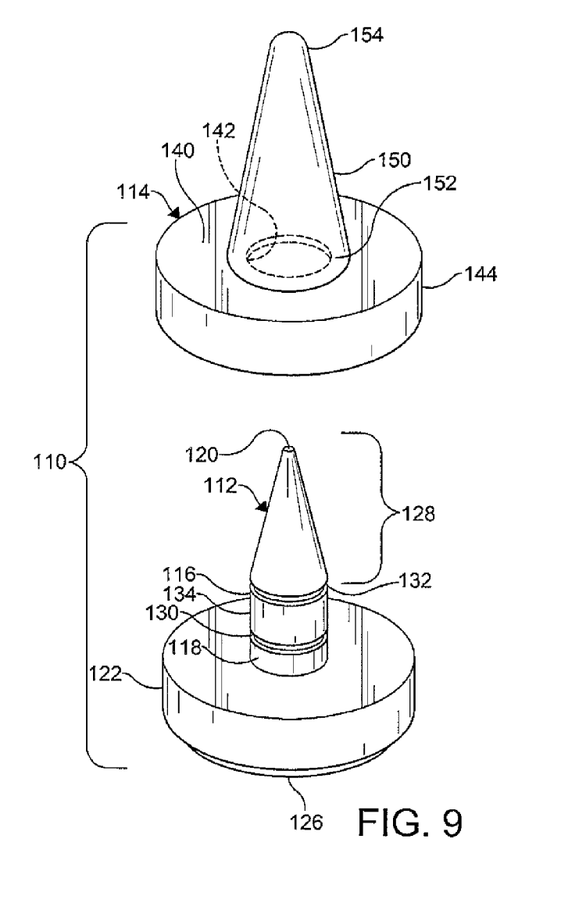
FIG. 9 is an exploded top perspective view of a fastener assembly according to another embodiment of the invention, wherein the fastener assembly includes a safety retainer and a base having a hollow sleeve.

FIG. 9 depicts a reusable fastener assembly 110 according to an embodiment of the invention. The fastener assembly 110 shown is used to removably attach a material (not shown) to a mounting structure (not shown) such as an inlet grate of a heating, ventilating, and air conditioning unit, for example. The fastener assembly 110 includes a base 112 and a safety retainer 114. Each of the base 112 and the safety retainer 114 can be formed from any suitable material such as a plastic material, a non-magnetic metal material, a magnetic metal material, or a combination thereof, for example.

In certain embodiments, the fastener assembly 110 further includes a magnetic interface (not shown) configured to be removably or permanently affixed to a mounting structure that is not magnetic in order to removably attach the material to the mounting structure, similar to the magnetic interface described hereinabove. The magnetic interface can be a plate-like member or a disk formed from a magnetically attractive material such as an iron material, a nickel material, a cobalt material, or a combination thereof, for example. It is understood, however, that the magnetic interface can be any member of a suitable size and shape. Various attachment means can be used to removably or permanently affix the magnetic interface to the non-magnetic mounting structure such as a double-sided tape having at least one removable protective covering disposed on one surface thereof, for example. Those skilled in the art will appreciate that the fastener assembly 110 can be used in other applications and systems than described herein if desired.

With renewed reference to FIG. 9, the base 112 includes an elongate shaft 116 having a first end 118 and a second end 120 opposite the first end 118. The shaft 116 shown has a generally circular cross-sectional shape. It is understood, however, that the shaft 116 can have any shape and size as desired. The first end 118 of the shaft 116 is configured to facilitate removable attachment of the fastener assembly 110 to the mounting structure or the magnetic interface disposed on the mounting structure. In certain embodiments, the first end 118 has a radially outwardly extending annular flange 122 formed thereon. A cavity formed in the first end 118 receives an attachment means 126 therein such as a magnet, and more particularly a neodymium magnet, for example. The cavity and the attachment means 126 can have any shape and size as desired such as circular, rectangular, square, triangular, or an irregular shape, for example. It is understood that the first end 118 may include other means of removably attaching the fastener assembly 110 to the mounting structure or the magnetic interface such as adhesive, hook and loop tape, and the like, for example.

In certain embodiments, the second end 120 is tapered forming a substantially conical or pointed end portion 128 of the shaft 116. The pointed end portion 128 allows the shaft 116 to be easily inserted through the material without a predefined opening formed therein. The second end 120 includes spaced apart first and second annular recesses 130, 132 formed in an outer surface 134 thereof. Additional or fewer recesses than shown can be employed if desired. The recesses 130, 132 shown extend continuously about a circumference of the shaft 116. The first recess 130 is formed adjacent the first end 118 of the base 112 and configured to secure the safety retainer 114 to the base 112. The second recess 132 is formed adjacent the pointed end portion 128 of the second end 120 of the shaft 116 and may also be configured to secure the safety retainer 114 to the base 112, depending on the thickness of the material disposed therebetween.

In certain embodiments, the safety retainer 114 is a generally circular body 140 having a central aperture 142 formed therein and a skirt portion 144 depending therefrom. An inner diameter of the central aperture 142 is slightly smaller than an outer diameter of the shaft 116 of the fastener assembly 110 to allow a portion of the body 140 of the safety retainer 114 to be received into the second recess 132 and/or the first recess 130, thereby securing the safety retainer 114 on the base 112. The skirt portion 144 extends from an outer peripheral edge of the body 140 to form a cavity for receiving the material therein. An outer diameter of the skirt portion 144 is larger than an outer diameter of the flange 122 of the base 112 to allow the material to be received therebetween. The safety retainer 114 further includes a hollow sleeve 150 having a first end 152 and a second end 154 opposite the first end 152. The first end 152 is coupled to or integrally formed with the body 140 and over the central aperture 142. The sleeve 150 is hollow and elongate, and, as shown in FIG. 9, has a generally conical shape having a generally circular cross-sectional shape. It is understood, however, that the sleeve 150 can have any shape and size as desired. The sleeve 150 is configured to sheath the elongate shaft 116 of the base 112, including the pointed end portion 128 thereof. The second end 154 forms a non-pointed end of the sleeve 150. In the embodiment shown in FIG. 9, the second end 154 is rounded. It is understood that the second end 154 may have any non-pointed shape, as desired. It is understood that the second end 154 may be substantially flat or have any other shape that to militate against damage to the pointed end 128 and/or to militate against an injury to a user of the fastener assembly 110 when the safety retainer 114 is disposed over the base 112.

In operation, the shaft 116 of the base 112 of the fastener assembly 110 is inserted into the material having the pointed end portion 128 of the base 112 pierce through the material. The shaft 116 of the base 112 is caused to extend through the material until the material abuts the flange 122 of the base 112 and the shaft 116 extends outwardly from the material. Thereafter, the safety retainer 114 is placed onto the shaft 116 of the base 112 having the shaft 116 extend through the central aperture 142 and into the sleeve 150. The safety retainer 114 travels along the shaft 116 until a portion of the body 140 of the safety retainer 114 is received into the second recess 132 or the first recess 130, respectively, and secured to the base 112. As the safety retainer 114 is secured on the base 112, the material is received into the cavity formed in the safety retainer 114 and compressed between the safety retainer 114 and base 112, thereby securing the fastener assembly 110 to the material. When the fastener assembly 110 is secured to the material, the flange 122 is caused to be received into the material which causes a surface of the attachment means 126 to be substantially flush or recessed within a surface of the material.

Figure 10:
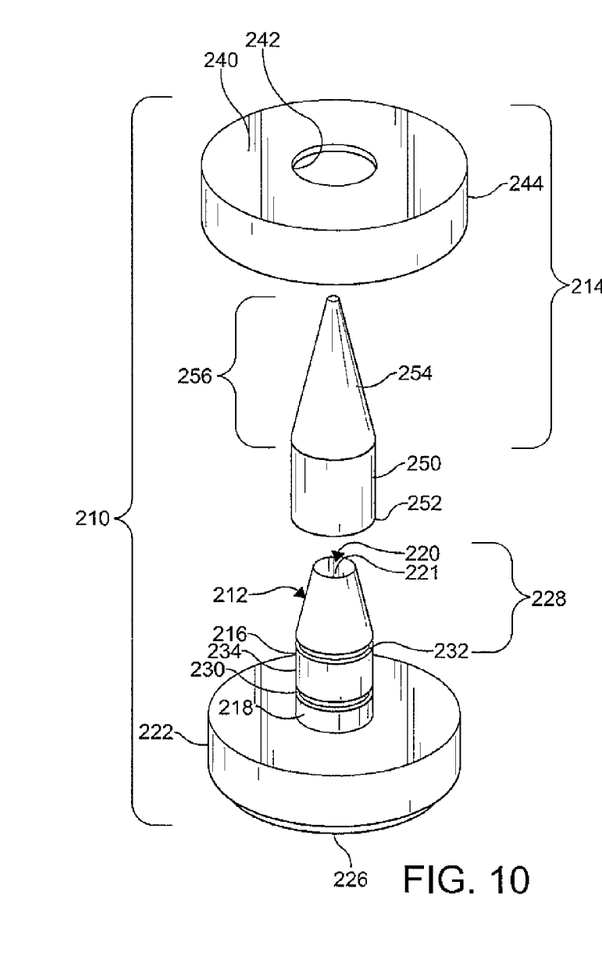
FIG. 10 is an exploded top perspective view of a fastener assembly according to yet another embodiment of the invention, wherein the fastener assembly includes a safety retainer and a base having a hollow sleeve.

FIG. 10 depicts a fastener assembly 210 according to an embodiment of the invention. The fastener assembly 210 shown is used to removably attach a material (not shown) to a mounting structure (not shown) such as an inlet grate of a heating, ventilating, and air conditioning unit, for example. The fastener assembly 210 includes a base 212 and a safety retainer 214 having a reusable hollow pointed sleeve 250. Each of the base 212 and the safety retainer 214 can be formed from any suitable material such as a plastic material, a non-magnetic metal material, a magnetic metal material, or a combination thereof, for example. The reusable sleeve 250 can be used repeatedly for numerous fastener assemblies 210, thereby minimizing waste and resources required to produce the sleeve 250 for each fastener assembly 210.

In certain embodiments, the fastener assembly 210 further includes a magnetic interface (not shown) configured to be removably or permanently affixed to a mounting structure that is not magnetic in order to removably attach the material to the mounting structure. The magnetic interface can be a plate-like member or a disk formed from a magnetically attractive material such as an iron material, a nickel material, a cobalt material, or a combination thereof, for example. It is understood, however, that the magnetic interface can be any member of a suitable size and shape. Various attachment means can be used to removably or permanently affix the magnetic interface to the non-magnetic mounting structure such as a double-sided tape having at least one removable protective covering disposed on one surface thereof, for example. Those skilled in the art will appreciate that the fastener assembly 210 can be used in other applications and systems than described herein if desired.

With renewed reference to FIG. 10, the base 212 includes an elongate shaft 216 having a first end 218 and a second end 220 opposite the first end 218. The shaft 216 shown has a generally circular cross-sectional shape. It is understood, however, that the shaft 216 can have any shape and size as desired. The first end 218 of the shaft 216 is configured to facilitate removable attachment of the fastener assembly 210 to the mounting structure or the magnetic interface disposed on the mounting structure. In certain embodiments, the first end 218 has a radially outwardly extending annular flange 222 formed thereon. A cavity formed in the first end 218 receives an attachment means 226 therein such as a magnet, and more particularly a neodymium magnet, for example. The cavity and the attachment means 226 can have any shape and size as desired such as circular, rectangular, square, triangular, or an irregular shape, for example. It is understood that the first end 218 may include other means of removably attaching the fastener assembly 210 to the mounting structure or the magnetic interface such as adhesive, hook and loop tape, and the like, for example.

In certain embodiments, the second end 220 is tapered forming non-pointed conical end portion 228 of the shaft 216. As shown in FIG. 10, the end portion 228 has a substantially blunt end 221, though the end portion 228 may be any non-pointed shape, such as a rounded end, for example, as desired. The second end 220 includes spaced apart first and second annular recesses 230, 232 formed in an outer surface 234 thereof. Additional or fewer recesses than shown can be employed if desired. The recesses 230, 232 shown extend continuously about a circumference of the shaft 216. The first recess 230 is formed adjacent the first end 218 of the base 212 and is configured to secure the safety retainer 214 to the base 212. The second recess 232 is formed adjacent the end portion 228 of the second end 220 of the shaft 216 and may be configured to secure the safety retainer 214 to the base 212.

In certain embodiments, the safety retainer 214 is a generally circular body 240 having a central aperture 242 formed therein and a skirt portion 244 depending therefrom. An inner diameter of the central aperture 242 is slightly smaller than an outer diameter of the shaft 216 of the fastener assembly 210 to allow a portion of the body 240 of the safety retainer 214 to be received into the second recess 232 and/or the first recess 230, respectively, and thereby secure the safety retainer 214 on the base 212. The skirt portion 244 extends from an outer peripheral edge of the body 240 to form a cavity for receiving the material therein. An outer diameter of the skirt portion 244 is larger than an outer diameter of the flange 222 of the base 212 to allow the material to be received therebetween. The safety retainer 214 further includes the hollow sleeve 250 having a first end 252 and a second end 254 opposite the first end 252. The sleeve 250 is formed separate from the safety retainer 214. The sleeve 250 shown has a generally circular cross-sectional shape. It is understood, however, that the sleeve 250 can have any shape and size as desired. The sleeve 250 is configured to sheath the elongate shaft 216 of the base 212. The second end 254 is tapered forming a substantially conical end portion 256 of the sleeve 250. The conical end portion 256 is pointed, as shown in FIG. 10. The end portion 256 allows the sleeve 250 to be easily inserted through the material without a predefined opening formed therein. The sleeve 250 may fit over the shaft 216 and be held in place by a friction fit or by engagement with the recess 230 and/or the recess 232, as desired.

In operation, the sleeve 250 of the safety retainer 214 of the fastener assembly 210 is disposed on the shaft 216 of the base 212, and the sleeve 250 is inserted into the material having the pointed end portion 256 of the safety retainer 214 pierce through the material. The shaft 216 of the base 212 inside the sleeve 250 is caused to extend through the material until the material abuts the flange 222 of the base 212 and the sleeve 250 extends outwardly from the material. Thereafter, the sleeve 250 is removed from the shaft 216, and the body 240 of the safety retainer 214 is placed onto the shaft 216 of the base 212 with the shaft 216 extending through the central aperture 242. It is understood that the sleeve 250 may be sized to fit through the aperture 242 so that the sleeve 250 need not be removed from the shaft 216 prior to body 240 being disposed over the shaft 216. The body 240 travels along the shaft 216 until a portion of the body 240 of the safety retainer 214 is received into, but not limited to, the second recess 232, and/or the first recess 230, respectively, and secured to the base 212. As the body 240 is secured on the base 212, the material is received into the cavity formed in the safety retainer 214 and compressed between the safety retainer 214 and base 212, thereby securing the fastener assembly 210 to the material. When the fastener assembly 210 is secured to the material, the flange 222 is caused to be received into the material which causes a surface of the attachment means 226 to be substantially flush or recessed within a surface of the material.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fastener assembly, comprising:
a base including an elongate shaft having a first end and a second end, the first end including an attachment means for removably attaching the fastener assembly to a mounting structure; and
a safety retainer having a body with a skirt portion extending therefrom forming a cavity and a hollow sleeve configured to be removably received onto the shaft to secure at least a portion of a material in the cavity of the skirt portion and between the skirt portion of the safety retainer and the base.

2. The fastener assembly of claim 1, wherein the hollow sleeve and the body are integrally formed.

3. The fastener assembly of claim 2, wherein the hollow sleeve has one of a substantially blunt end portion and a rounded end portion.

4. The fastener assembly of claim 3, wherein the elongate shaft has a pointed end portion.

5. The fastener assembly of claim 1, wherein the elongate shaft has one of a substantially blunt end portion and a rounded end portion.

6. The fastener assembly of claim 1, wherein the first end of the base includes at least one recess formed therein.

7. The fastener assembly of claim 6, wherein the at least one recess of the first end of the base is configured to receive a portion of the safety retainer therein.

8. The fastener assembly of claim 7, wherein an inner diameter of the hollow sleeve is smaller than an outer diameter of the shaft of the base to allow a portion of the safety retainer to be received within the at least one recess to secure the safety retainer on the base.

9. The fastener assembly of claim 7, wherein the second end of the base includes a second recess formed therein, the second recess configured to receive a portion of the safety retainer therein.

10. A fastener assembly, comprising:
a base including an elongate shaft having a first end and a second end, the first end including an attachment means for removably attaching the fastener assembly to a mounting structure; and
a safety retainer having a hollow sleeve to receive the elongate shaft and a body with a skirt portion extending therefrom to secure the at least a portion of the material in the cavity of the skirt portion and between the skirt portion of the safety retainer and the base, wherein an inner diameter of the hollow sleeve is smaller than an outer diameter of the elongate shaft of the base to allow a portion of the safety retainer to be received within at least one recess to secure the safety retainer on the base.

11. The fastener assembly of claim 10, wherein the hollow sleeve and the body are integrally formed.

12. The fastener assembly of claim 10, wherein the hollow sleeve has one of a substantially blunt end portion and a rounded end portion.

13. The fastener assembly of claim 10, wherein the elongate shaft has a pointed end portion.

14. The fastener assembly of claim 10, wherein the hollow sleeve and the body are separately formed.

15. The fastener assembly of claim 10, wherein the hollow sleeve has a pointed end portion.

16. The fastener assembly of claim 15, wherein the elongate shaft has one of a substantially blunt end portion and a rounded end portion.

17. A fastener assembly, comprising:
a base including an elongate shaft having a first end and a second end, the first end including an attachment means for removably attaching the fastener assembly to a mounting structure; and
a safety retainer having a hollow sleeve to receive the elongate shaft of the base and a body with a skirt portion extending therefrom to secure the at least a portion of the material in the cavity of the skirt portion and between the skirt portion of the safety retainer and the base, wherein an inner diameter of the hollow sleeve is smaller than an outer diameter of the elongate shaft of the base to allow a portion of the safety retainer to be received within at least one recess to secure the safety retainer on the base and wherein the elongate shaft has a pointed end adapted to pierce through the material and the hollow sleeve is elongate and has a generally conical shape.

18. The fastener assembly of claim 17, wherein the hollow sleeve and the body are integrally formed.

19. The fastener assembly of claim 17, wherein the second end of the base includes a second recess formed therein, the second recess configured to receive a portion of the safety retainer therein.

* * * * *